April 7, 1931.  E. BURKE ET AL  1,799,673
MULTIPLE CONDUIT
Filed Oct. 7, 1926

Inventors
Edmund Burke
John C. Sherman
by their attorneys

Patented Apr. 7, 1931

1,799,673

UNITED STATES PATENT OFFICE

EDMUND BURKE, OF PORTLAND, AND JOHN C. SHERMAN, OF GORHAM, MAINE, ASSIGNORS TO BROWN COMPANY, OF BERLIN, NEW HAMPSHIRE, A CORPORATION OF MAINE

MULTIPLE CONDUIT

Application filed October 7, 1926. Serial No. 139,976.

This invention relates to built-up units of multiple conduit and methods for producing the same. In the laying of underground or enclosed wires for telephones, power transmission or otherwise, the wires are frequently led through a number of parallel conduits of moderate size, it being usually of advantage to segregate different wires or groups of wires. Consequently there are many installations calling for a series of parallel conduits. Where an installation of this kind is desired, it has been the practice to use tile conduit having multiple passages, or more recently where it is desired to use waterproofed fibrous conduit, sections of single conduit have been built up in the process of laying, suitable blocks being used to space the parallel conduits evenly. The fibrous type of conduit has many advantages over the vitreous type, among them being lightness, cheapness, strength and toughness. Furthermore, the material can be machined so that the ends can be easily shaped to make tight joints. Especially suited for uses of this kind is conduit made by extruding a heated plastic mass of fiber thoroughly mixed with a suitable waterproofing binder and formed into tubular shape as described in an applicaiton of John C. Sherman, Serial No. 127,260, filed August 5, 1926. Another suitable kind of conduit for the purpose is that which is made by rolling up a sheet of wet pulp under pressure into tubes having walls of homogeneous consistency, drying the tubes, and impregnating them with waterproofing material. But we do not limit ourselves to any particular kind of conduit. Where an installation calls for several parallel conduits, however, the cost of laying has been unnecessarily large. By our invention, we provide made-up sections of multiple conduit. Such sections can be made up of any desired number of single conduits within reasonable limits, and their use greatly facilitates the laying of multiple lines of conduit. They are easily handled, easily alined, and the ends of the individual conduits in the multiple sections may (and preferably do) have machined ends to interfit with corresponding ends of other sections and to form watertight joints.

The sections of multiple conduit may be made up in a variety of ways. In general, we prefer to use spacing material between the individual conduit sections, the individual sections being held against the spacing material by adhesion, by encircling straps or tie members, or by both.

Further advantageous features of construction will appear from the description of our invention which follows and from the drawing, of which,—

Figure 1:
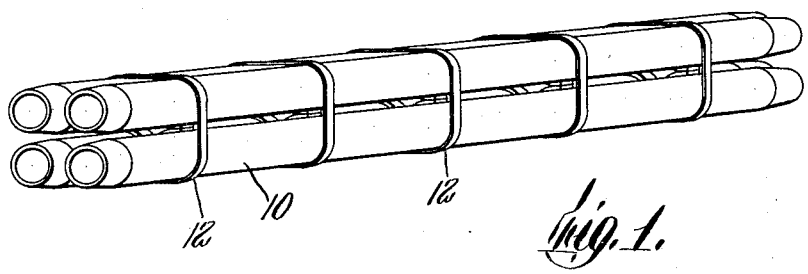
Figure 1 is a perspective of a section of multiple conduit embodying a form of our invention.
Figure 2:
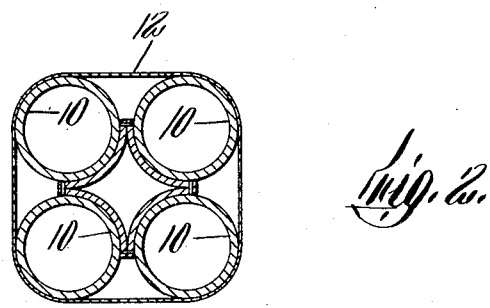
Figure 2 is a transverse section of the conduit assembly shown in Figure 1.
Figure 3:
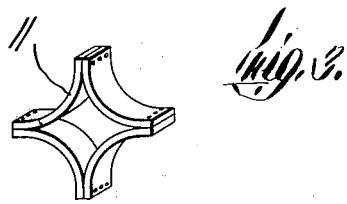
Figure 3 is a perspective of a preferred form of spacer for use between conduits.
Figure 4:
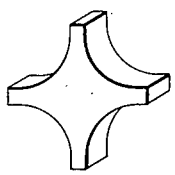
Figure 4 shows a modification of the spacer member illustrated in Figure 3.

Referring to the drawings in detail, 10 represents sections of individual conduit of any suitable length which may be assembled into a multiple conduit such as that shown. For this purpose we prefer to use conduit of the water-proofed fibrous type which usually comprises cellulosic or asbestos fiber thoroughly mixed or impregnated with a waterproofing compound such for example as pitch, asphalt, wax tailings or their equivalent. In making up a multiple conduit section, it is desirable that the individual conduits be spaced as accurately as possible from each other so as to avoid difficulty in joining abutting ends of successive sections when the latter are laid. It is also desirable at times to space the individual conduits apart from each other so as to permit the pouring of concrete around the conduits when laid in order to make a unified mass of the whole installation. In order to carry out these purposes as simply and economically as possible, we prefer to use for an assembly of four tubes as illustrated, a pre-formed spacer or core member such as is shown in Figure 3 or Figure 4. The former may be made from a short length of tubing, the interior diameter of which is equal to the exterior diameter of the conduit in the assembly. This short length of tubing may be split longitudinally into four equal pieces each comprising about 90° of arc. By arranging the pieces so that the interior concave surface of each faces outwardly, the pieces may be fastened together by pegs, adhesives, or otherwise, in a shape such as is shown in Figure 3, preferably symmetrical to an axis. Since the concave faces of each of the pieces 11 has a radius of curvature equal to the exterior radius of its corresponding conduit 10, the latter will fit closely against them as indicated in Figure 2 and may be secured thereto by adhesives, such as marine glue, pitch or the like, or by any other desired fastening means. The spacer shown in Figure 4 consists of a block of light material such as wood having four concavities symmetrically arranged to receive the cylindrical walls of the conduits. Both forms of spacer are characterized by their comparative lightness of weight, and the concave faces against which a portion of the side walls of single conduits is adapted to fit. In order to strengthen the assembly and to hold the conduits 10 strongly in contact with the spacers, we may provide tie members 12 comprising strands or strips of material passed around the assembly and firmly secured, a tie member 12 being preferably placed opposite each spacer used in the assembly. The tie members are secured in any desired manner appropriate to the material of which they are made. Thus strings may be knotted, wires twisted, metal bands spot welded, etc. On account of their strength and lightness, thin steel bands are found very satisfactory.

After a section of multiple conduit has been built up, it is preferably dipped into or otherwise coated with a suitable waterproofing preparation such as molten pitch or its equivalent.

Having thus described an embodiment of our invention, it should be evident to those skilled in the art that various changes and modifications may be made therein without departing from its spirit or scope as defined by the appended claims.

We claim:—

1. As a new article of manufacture, a section of multiple conduit comprising a plurality of sections of single conduit in substantially parallel relation, a plurality of pre-formed spacing members positioned between and fitting against the single conduits, and a separate tie member encircling said conduits opposite each said spacing member.

2. A spacing member for building up multiple conduit, comprising a plurality of sectors of short length tubing, each said sector being arranged to face outwardly and being fastened adjacent to its ends to adjoining sectors.

3. A spacing member for building up multiple conduit from a single fiber conduit, comprising a plurality of sectors of short length tubing, each sector having an interior radius substantially equal to the exterior radius of the conduit to rest thereagainst, said sectors being arranged about a center with concave surfaces facing outward, the ends of each sector being fastened to the next adjacent sectors.

In testimony whereof we have affixed our signatures.

EDMUND BURKE.
JOHN C. SHERMAN.